(12) United States Patent
Muralimanohar et al.

(10) Patent No.: US 11,785,488 B2
(45) Date of Patent: Oct. 10, 2023

(54) ENHANCED REAL-TIME NETWORK CONSUMPTION TRACKING FOR WIRELESS NETWORKS

(71) Applicant: Verizon Patent and Licensing Inc., Basking Ridge, NJ (US)

(72) Inventors: Madhan Muralimanohar, Tampa, FL (US); Jolly Lal, Belle Mead, NJ (US); Marc Chiaverini, Randolph, NJ (US); Muthukumar Retnasamy, Tampa, FL (US); Hans Raj Nahata, New Providence, NJ (US); Barry F. Hoffner, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 127 days.

(21) Appl. No.: 17/387,558

(22) Filed: Jul. 28, 2021

(65) Prior Publication Data
US 2023/0037097 A1 Feb. 2, 2023

(51) Int. Cl.
*H04W 24/08* (2009.01)
*H04L 43/0876* (2022.01)
*H04W 4/24* (2018.01)
*H04M 15/00* (2006.01)

(52) U.S. Cl.
CPC ......... *H04W 24/08* (2013.01); *H04L 43/0876* (2013.01); *H04W 4/24* (2013.01); *H04M 15/58* (2013.01)

(58) Field of Classification Search
CPC ........ H04W 24/08; H04W 4/24; H04M 15/58
USPC .......................................................... 455/405
See application file for complete search history.

(56) References Cited

U.S. PATENT DOCUMENTS

| | | | | |
|---|---|---|---|---|
| 8,745,220 B2 * | 6/2014 | Raleigh | ................ | H04M 15/66 709/224 |
| 2003/0133552 A1 * | 7/2003 | Pillai | ..................... | H04M 15/44 379/114.01 |
| 2019/0364464 A1 * | 11/2019 | Shaikh | .................. | H04M 15/66 |
| 2021/0120128 A1 * | 4/2021 | Raleigh | .............. | H04M 15/846 |
| 2022/0014882 A1 * | 1/2022 | Fiorese | ................ | H04W 28/16 |
| 2022/0312269 A1 * | 9/2022 | Saker | .................... | H04M 15/65 |

FOREIGN PATENT DOCUMENTS

WO    WO-2010088080 A1 *    8/2010    ........... G06F 15/177

\* cited by examiner

*Primary Examiner* — Mong-Thuy T Tran (57) ABSTRACT

A real-time network consumption tracking service is provided. A charging function (CHF) device receives transaction records of network consumption by user equipment (UE) devices in a wireless network and generates individual event messages based on each of the transaction records. Each of the individual event messages includes a detailed record based on one of the transaction records. The CHF device associates each of the individual event messages with a message bus topic, formats each of the individual event messages for publication on the message bus, and publishes each of the formatted individual event messages to the message bus. The message bus is accessible to external systems that generate dynamic network consumption data sets based on the formatted individual event messages.

20 Claims, 7 Drawing Sheets

ENHANCED REAL-TIME NETWORK CONSUMPTION TRACKING FOR WIRELESS NETWORKS

BACKGROUND

Long Term Evolution (LTE) is a mobile telecommunications standard for wireless communications involving mobile user equipment, such as mobile devices and data terminals. LTE networks include existing Fourth Generation (4G) and 4.5 Generation (4.5G) wireless networks. Next Generation mobile networks, such as Fifth Generation (5G) mobile networks, are being implemented as the next stage networks in the evolution of mobile wireless networks. 5G networks may use different frequencies, different radio access technologies, and different core network functions than legacy wireless networks (e.g., 4G networks). While 5G networks are being deployed and evolving, 5G-capable end devices need to be supported in legacy networks, such as LTE networks.

Wireless core networks will be required to support network consumption tracking for all subscribers in both 4G and 5G networks. Network consumption records are required for external systems for various purposes such as providing network consumption views to subscribers, supporting law enforcement, and conducting internal auditing.

DETAILED DESCRIPTION OF EXAMPLE EMBODIMENTS

The following detailed description refers to the accompanying drawings. The same reference numbers in different drawings may identify the same or similar elements.

Network consumption tracking may provide a variety of information about activity on mobile networks. Network consumption may include, for example, use of various network resources by a subscriber device. Currently, in 5G networks, a charging function (CHF) of the core network may generate the network consumption records as a file using standard data model. The file is generated as an offline process. Additionally, the CHF may provide separate online notifications with a lightweight message.

Current online notifications from the CHF use an interface (e.g., a TCP/IP interface) to transfer critical data to external systems that is not sufficiently reliable and scalable. In transaction systems, TCP/IP is unreliable in the sense that there is no persistence—if the communication system goes down, a TCP/IP socket cannot recover to the state prior to a crash. Such interfaces are not suitable for detailed information with large records, and, thus, online notifications cannot be relied upon for law enforcement inquiries (e.g., Communications Assistance for Law Enforcement Act (CALEA) inquiries), internal auditing, and other detailed requests. Current online notifications also do not support data retention, which can result in data loss in the event of a network failure.

Current offline processes incur delays while a CHF collects thousands of records to generate as a file. The offline processes include multiple processing steps such as collection, generation, transformation, and transmission. The large number of records and multiple processing steps result in significant delay and prevent processing of the records in real-time for use by external systems. Furthermore, the current offline process requires a file transfer mechanism which raises security concerns by using legacy protocols.

Systems and methods described herein provide a real-time network consumption tracking service that addresses shortcomings of the current online notifications and offline processes in 5G networks. According to an implementation, the systems and methods implementing real-time network consumption tracking eliminate the offline process (e.g., file generation process) currently used by the CHF and introduces an "Event Generation Process" to integrate with a message bus. The real-time network consumption tracking service enables real-time data transfer (e.g., an online process) between a CHF and external systems through a publish-subscribe (or pub-sub) environment. The message bus is accessible to the external systems, which generate dynamic network consumption data sets based on individual event messages.

In contrast to current offline processes, the "Event Generation Process" does not wait to collect thousands of records. Instead, the CHF may generate an event for each record received and may publish each event to a message bus. Current interfaces are replaced with a message bus pub-sub model for online processing, such that there can be real-time (or near-real-time) publication generated records under particular message bus topics. Implementations described herein may provide improved data retention policy (e.g., persistence of data for multiple days), support the latest security mechanisms (e.g., TLS), and prevent data loss.

Figure 1:
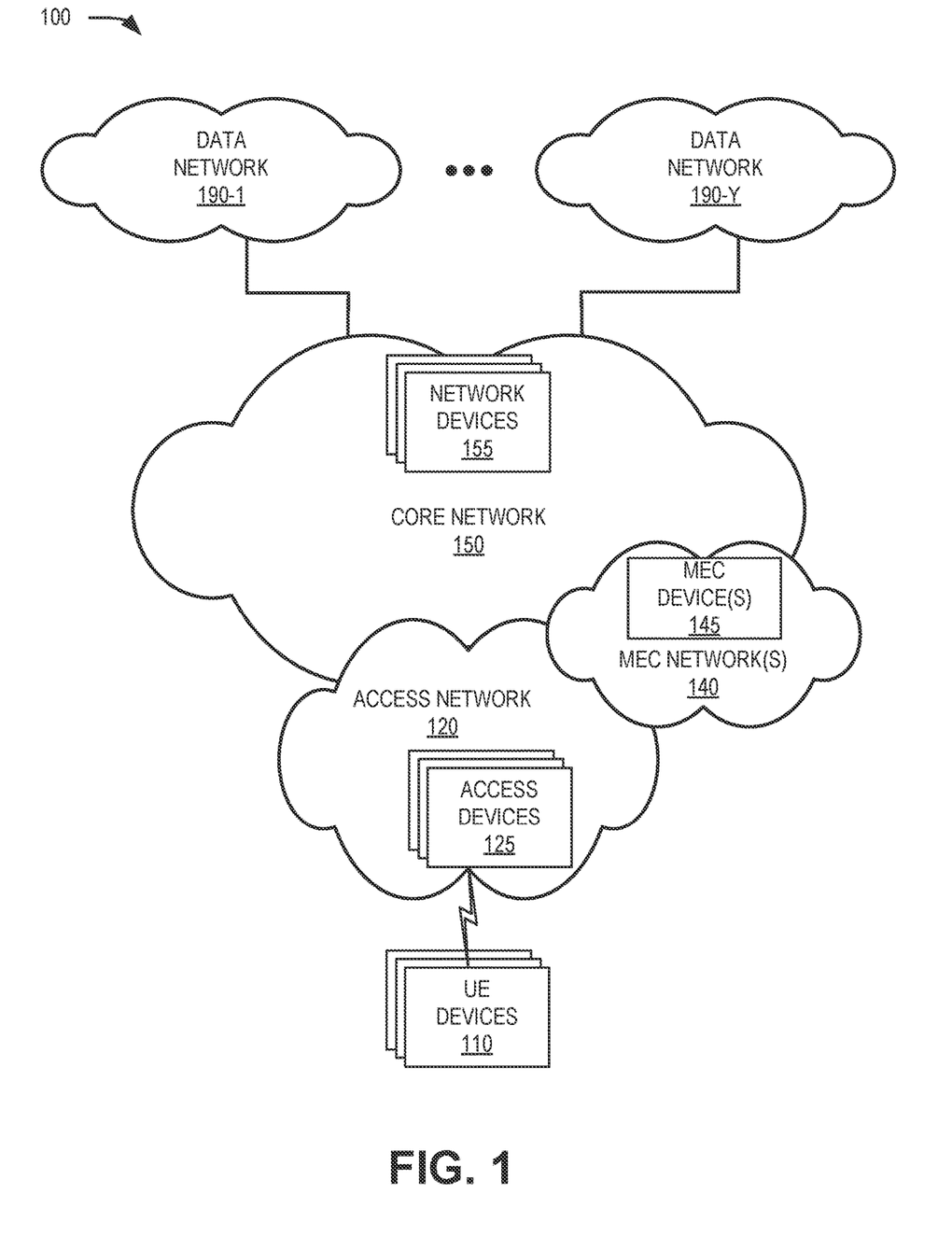
FIG. 1 is a diagram illustrating an example network environment in which a real-time network consumption tracking service described herein may be implemented.

FIG. 1 is a diagram of an example environment 100 in which the systems and/or methods described herein may be implemented. As shown in FIG. 1, environment 100 may include UE devices 110, a radio access network (RAN) 120 that includes access devices 125, multi-access edge computing (MEC) networks 140 that include MEC devices 145, a core network 150 that includes network devices 155, and data networks (DNs) 190-1 to 190-Y (referred to herein collectively as "DNs 190" and individually as "DN 190").

UE device 110 may include a device with cellular wireless communication functionality. For example, UE device 110 may include a handheld wireless communication device (e.g., a smart phone, etc.), a wearable computer device (e.g., a wristwatch computer device, etc.), a computer; a WiFi access point, a portable gaming system, an Internet-of-Things device, a fixed wireless access device, and/or any other type of computer device with wireless communication capabilities. UE device 110 may include capabilities for voice communication, mobile broadband services (e.g., video streaming, real-time gaming, premium Internet access etc.), best effort data traffic, and/or other types of applications. UE device 110 may be associated with a subscriber/account for using services of access network 120, MEC network 140, and/or core network 150.

Access network 120 may enable UE devices 110 to connect to core network 150 via access devices 125 using cellular wireless signals. Access device 125 may include a 5G New Radio (NR) base station (e.g., a gNodeB) and/or a Fourth Generation (4G) Long Term Evolution (LTE) base station (e.g., an eNodeB). Each access device 125 may include devices and/or components configured to enable cellular wireless communication with UE devices 110. For example, access device 125 may include a radio frequency (RF) transceiver configured to communicate with UE devices using a 5G NR air interface, a 4G LTE air interface, and/or using another type of cellular air interface. Access device 125 may enable communication with core network 150 to enable core network 150 to authenticate and monitor network activity of UE device 110. According to one implementation, access network 120 may include a non-standalone (NSA) network to support dual coverage using 4G and 5G networks. In another implementation, access network 120 may include a 5G standalone (SA) architecture.

Each MEC network 140 may be associated with one or more access devices 125 and may provide MEC services for UE devices 110 attached to the access devices 125. MEC network 140 may be in proximity to the access devices 125 from a geographic and network topology perspective, thus enabling low latency communication with UE devices 110 and/or access devices 125. As an example, MEC network 140 may be located on a same site as one of the access devices 125. As another example, MEC network 140 may be geographically closer to the access devices 125 and reachable via fewer network hops and/or fewer switches than other access devices 125 and/or data networks 190.

MEC network 140 may include one or more MEC devices 145. MEC devices 145 may provide MEC services to UE devices 110, such as, for example, content delivery of streaming audio and/or video, cloud computing services, authentication services, etc. In some implementations, MEC devices 145 may host deployed VNFs used to implement particular network slices.

Core network 150 may be managed by a provider of cellular wireless communication services and may manage communication sessions of subscribers connecting to core network 150 via access network 120. Core network 150 may include one or multiple networks of different types and technologies. For example, core network 150 may be implemented to include a next generation core (NGC) network for a 5G network, an Evolved Packet Core (EPC) of an LTE network, an LTE-A network, an LTE-A Pro network, another type of 4G core network, and/or a legacy core network.

Core network 150 may include various network devices 155. Depending on the implementation, network devices 155 may include 5G core network components (e.g., a User Plane Function (UPF), an Application Function (AF), an Access and Mobility Management Function (AMF), a Session Management Function (SMF), a Unified Data Management (UDM) function, a Network Slice Selection Function (NSSF), a Policy Control Function (PCF), a Unified Data Repository (UDR) etc.), 4G core network components (e.g., a Serving Gateway (SGW), a Packet Data Network Gateway (PGW), a Mobility Management Entity (MME), a Home Subscriber Server (HSS), etc.), or another type of core network components (e.g., future 6G network components). In other implementation, network devices 155 may include combined 4G and 5G functionality, such as a session management function with PDN gateway-control plane (SMF+PGW-C) and a user plane function with PDN gateway-user plane (UPF+PGW-U).

Network device 155 may include a physical function node or a virtual network function (VNF). Thus, the components of core network 150 may be implemented as dedicated hardware components and/or as VNFs implemented on top of a commonly shared physical infrastructure using Software Defined Networking (SDN). The shared physical infrastructure may be implemented using one or more devices 600 described below with reference to FIG. 6 in a cloud computing center associated with core network 150. Additionally, or alternatively, some, or all, of the shared physical infrastructure may be implemented using one or more devices 600 included in MEC device 145.

DNs 190 may each include a data network, such as a packet data network. A particular DN 190 may be associated with an Access Point Name (APN) and UE device 110 may request a connection to the particular packet data network 190 using the APN. DN 190 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows example components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
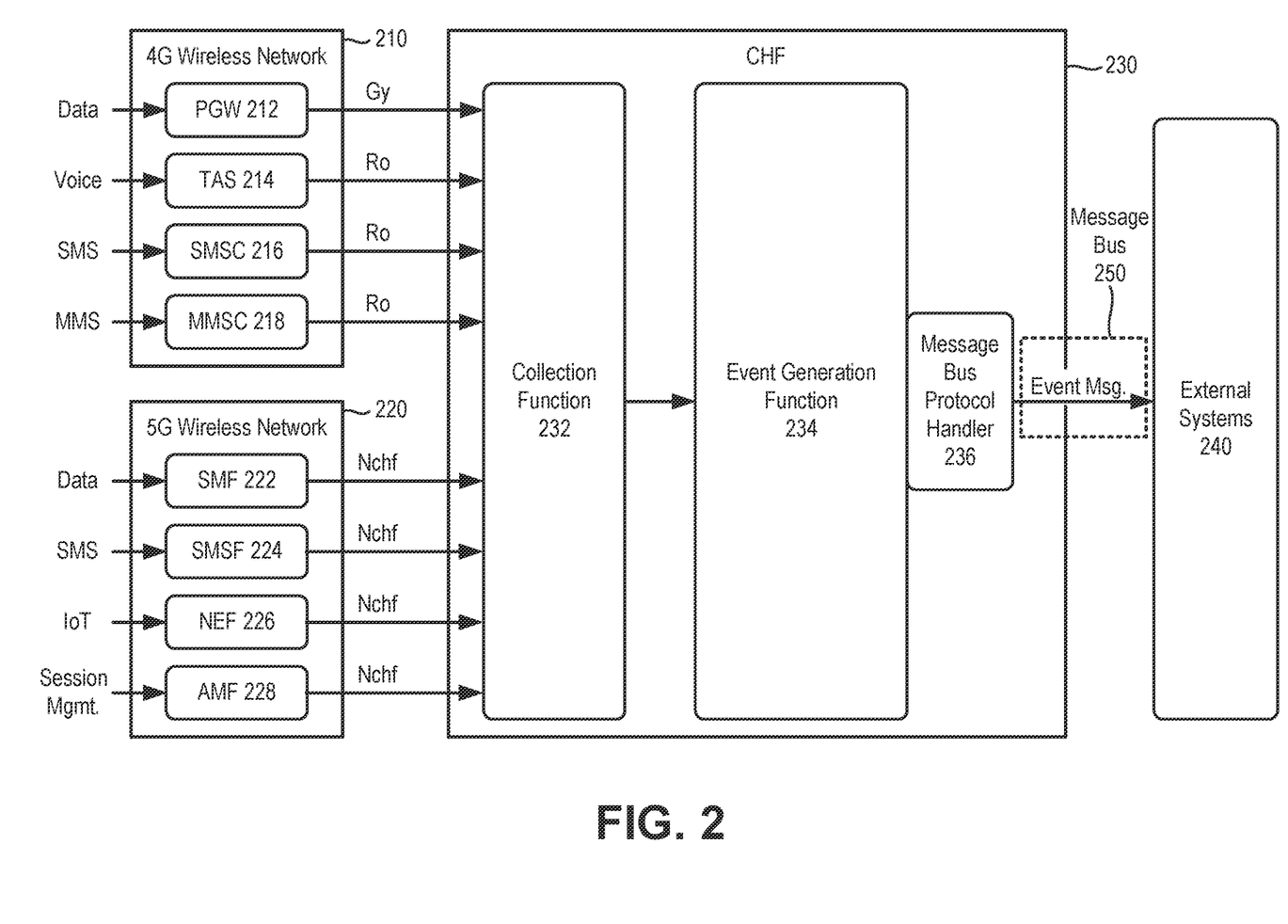
FIG. 2 is a diagram illustrating another example environment in which an embodiment of the real-time network consumption tracking service may be implemented.

FIG. 2 is a diagram illustrating another example environment 200 in which an embodiment of the real-time network consumption tracking service may be implemented. As illustrated, environment 200 includes 4G wireless network components 210, 5G wireless network components 220, a CHF 230, external systems 240, and a message bus 250. 4G wireless network components 210 and 5G wireless network components 220 may generate network consumption data. Network consumption data may include traditional usage data, such as voice minutes, data bytes, text messages, etc., or technology-conditioning of usage data. Examples of technology-conditioning of usage data may include data-bytes over particular frequency bands (e.g., data-bytes over LTE bands, data-bytes over C-band, or data bytes over millimeter wave. band). Network consumption data may also include other data more specific to 5G use cases, such as a number of session connects (e.g., by an IoT device) or consumption of data-bytes under low-latency conditions. Examples of particular devices/functions that generate network consumption data are described further below. 4G wireless network components 210 and 5G wireless network components 220 may be referred to collectively as network functions.

4G wireless network components 210 may generate network consumption data that may be used for CHF events. In FIG. 2, 4G wireless network components 210 may include a PGW 212, a Telephony Application Server (TAS) 214, a Short Message Service Center (SMSC) 216, and a Multimedia Message Service Center (MMSC) 218. A single PGW 212, TAS 214, SMSC 216, and MMSC 218 are illustrated for simplicity. In other implementations, 4G wireless network components 210 may include multiple instances of PGW 212, TAS 214, SMSC 216, and MMSC 218 in addition to other components. 4G wireless network components 210 may be included in MEC network 140 (e.g., MEC devices 145), core network 150 (e.g., network devices 155), and/or DN 190.

PGW 212 may function as a gateway to a DN 190, which may provide various services to UE 110. A particular UE 110 may be connected to multiple PGWs 212, one for each data network with which UE 110 communicates. PGW 212 may generate records related to data sessions in a 4G network (e.g., 4G components of access network 120, core network 150, etc.). PGW 212 may provide data session information to CHF 230 using a Gy interface implemented, for example, using a Diameter protocol.

TAS 214 may include a network device, or a collection of computing devices, that store, process, and forward data. In some implementations, TAS 214 may include a back-to-back session initiation protocol (SIP) user agent capable of maintaining and notifying devices of call states. Additionally, or alternatively, TAS 214 may provide various telephony services that may not be directly related to routing network messages. For example, TAS 214 may provide telephony services, such as call waiting, call forwarding, call conferencing, or other types of services relating to communication sessions. TAS 214 may generate records related to voice sessions in the 4G network (e.g., 4G components of access network 120, core network 150, etc.). TAS 214 may provide voice session information to CHF 230 using an Ro interface, for example.

SMSC 216 may include one or more devices, such as network devices, for implementing short message service (SMS) in a mobile network. SMSC 216 may generally be responsible for locating a destination user and submitting the message to the destination user. SMSC 216 may receive an SMS message from an originator (e.g., an application server or end device 110) and may route or switch the SMS message to another end device 110. In some implementations, SMSC 216 may be located in core network 150. SMSC 216 may generate records related to SMS delivery over the 4G network (e.g., 4G components of access network 120, core network 150, etc.). SMSC 216 may provide SMS information to CHF 230 using an Ro interface, for example.

MMSC 218 may include one or more devices, such as network devices, that manage the receipt and transmission of Multimedia Messaging Service (MMS) messages between mobile devices 110. MMSC 218 may generally be responsible for locating a destination user and submitting the message to the destination user. MMSC 218 may receive an MMS message from an originator (e.g., an application server or end device 110) and may route or switch the MMS message to another end device 110. In some implementations, MMSC 218 may be located in core network 150. MMSC 218 may generate records related to MMS delivery in the 4G network (e.g., 4G components of access network 120, core network 150, etc.). MMSC 218 may provide MMS information to CHF 230 using an Ro interface, for example.

5G wireless network components 220 may generate network consumption data that may be used for CHF events. In the illustration of FIG. 2, 5G wireless network components 220 may include a SMF 222, SMSF 224, NEF 226, and AMF 228. A single SMF 222, SMSF 224, NEF 226, and AMF 228 are illustrated for simplicity. In other implementations, 5G wireless network components 220 may include multiple instances of SMF 222, SMSF 224, NEF 226, and AMF 228 in addition to other components. 5G wireless network components 250 may be included in MEC network 140 (e.g., MEC devices 145), core network 150 (e.g., network devices 155), and/or DN 190.

SMF 222 may, among other tasks, perform, session establishment, session modification, and/or session release; perform IP address allocation and management; perform Dynamic Host Configuration Protocol (DHCP) functions; charge data collection; support charging interfaces; and control and coordinate charging data collection. SMF 222 may communicate with a user plane function (UPF). The UPF may be configured to measure and report, to CHF 230 via SMF 222, performance parameters such as, for example, data throughput, data rate, latency, jitter, etc. SMF 222 may generate records related to data sessions in a 5G network (e.g., 5G components of access network 120, core network 150, etc.). SMF 222 may provide data session information to CHF 230 using an Nchf interface, for example.

SMSF 224 may perform SMS services for UE devices 110. SMSF 224 may generate records related to SMS delivery in the 5G network (e.g., 5G components of access network 120, core network 150, etc.). SMSF 224 may provide SMS information to CHF 230 using an Nchf interface, for example.

NEF 226 may expose capabilities and events to other network functions, including third party network functions, application functions, edge computing network functions, and/or other types of network functions. Furthermore, NEF 226 may secure provisioning of information from external applications to core network 150, translate information between core network 150 and devices/networks external to core network 150, support a Packet Flow Description (PFD) function, and/or perform other types of network exposure functions. According to an implementation, NEF 226 may generate records related to Internet-of-Things (IoT) sessions in the 5G network (e.g., 5G components of access network 120, core network 150, etc.). NEF 226 may provide IoT session information to CHF 230 using an Nchf interface, for example.

AMF 228 may perform registration management, connection management, reachability management, mobility management, lawful intercepts, and/or other types of management processes. According to an implementation, AMF 228 may generate records related to number of sessions by the end-user device and roaming related sessions in the 5G network (e.g., 5G components of access network 120, core network 150, etc.). AMF 228 may provide session- and connection-related data (e.g., a number of times a device establishes sessions, roaming data, etc.) to CHF 230 using an Nchf interface, for example.

CHF 230 may perform charging and/or billing functions for core network 150. CHF 230 may correspond, for example, to one or more of network devices 155. CHF 230 may track subscriber network consumption and generate the consumption records. For example, CHF 230 may generate a charging record for UE device 110 based on data flow information associated with UE device 110.

As shown in FIG. 2, CHF 230 may include a collection function 232, an event generation function 234, and a message bus protocol handler 236. According to implementations described herein, functionality of CHF 230 may be modified from current standards to eliminate separate notification generation processes and file generation processes. Instead, CHF 230 may use a new "Event Generation Process" to generate detailed lightweight events for real-time publication to a message bus. In contrast with the current file generation process, the Event Generation Process may not wait to collect all the records for a session or data flow. Instead, for every record CHF 230 receives, CHF 230 may generate a detailed event and publish the individual event record directly into a message bus topic.

Collection function 232 may receive transaction records of session activity (e.g., for voice, data, SMS, roaming, etc.) from 4G wireless network components 210 and/or 5G wireless network components 220. Collection function 232 may feed the transaction records to event generation function 234 which may publish an event record of each transaction without collecting multiple records.

Figure 3:
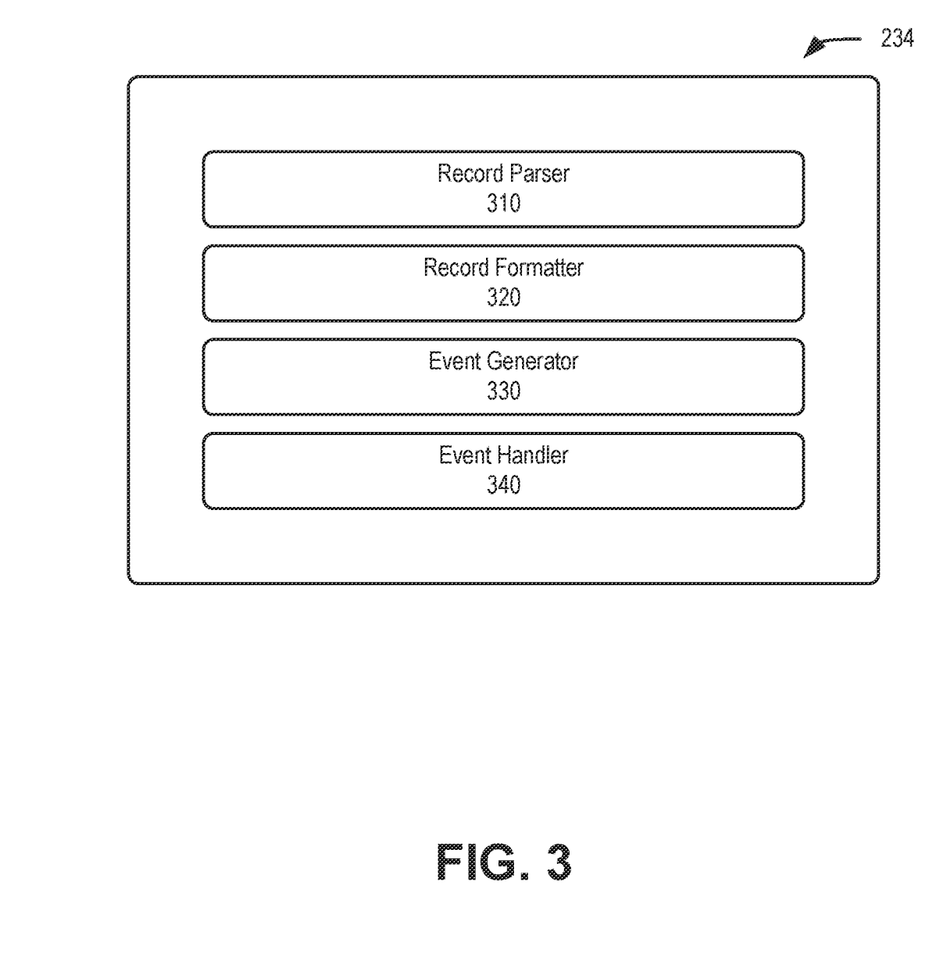
FIG. 3 is a diagram illustrating example logical components of an event generation function for the real-time network consumption tracking service.

Event generation function 234 may distribute network consumption information in a transaction-based, real-time fashion. FIG. 3 illustrates example logical components of event generation function 234. As shown in FIG. 3, event generation function 234 may include a record parser 310, a record formatter 320, an event generator 330, and an event handler 340.

Record parser 310 may inspect each transaction record received from one of 4G wireless network components 210 and/or 5G wireless network components 220 to ensure items are defined and fields comport with standards (e.g., 3GPP standards) for the wireless network. Record parser 310 may evaluate incoming information based on, for example, different record formats that match different sources.

Record formatter 320 may provide a uniform format for records received from record parser 310. For example, transactions records provided to CHF 230 may include different formats depending on the type/vendor of the originating 4G wireless network components 210 and/or 5G wireless network components 220. Record formatter 320 may convert parsed records into a common format suitable for CHF to use in generating events.

Event generator 330 converts formatted records from record formatter 320 into event messages. More particularly, event generator 330 transforms the formatted heavyweight records into a lightweight event message that includes sufficient detail to support functions of external systems 240 (e.g., providing network consumption views to subscribers, supporting law enforcement, and conducting internal auditing) in near-real time. The lightweight event message may be processed online (e.g., without collecting multiple records into a file) for immediate publication into message bus 250. In contrast with heavyweight records, the lightweight event message contains only critical information which is sufficient for the external systems 240 to understand the details and trigger a next step in the sequence of a real-time process. Lightweight events may eliminate unnecessary record details, such as sequence chain header information, session span information depending upon the type of session (e.g., byte based session), pattern of network consumption, and others that are not required for external systems 240.

Event handler 340 may configure events from event generator 330 for publication in message bus 250. For example, event handler 340 may apply any headers, footers, topics identifiers, unique identifiers, etc., at the front of the event message, that are necessary to enable publication of the event message to message bus 250. According to an implementation, event handler 340 may apply a topic header to the event message. The topic header may indicate, for example, a dedicated network consumption topic to be used with message bus 250.

Referring again to FIG. 2, Message bus protocol handler 236 may receive event messages from event generation function 234 (e.g., event handler 340) and may publish each event message to message bus 250 using secure signaling, such as Hypertext Transfer Protocol Secure (HTTPS) signaling.

External systems 240 include network or computer devices that may obtain consumption records (e.g., event messages) published to message bus 250 via CHF 230. External systems 240 may correspond to one of MEC devices 145, network devices 155, and/or devices in data networks 190 and may operate as consumers for message bus 250. External system 240 may subscribe to one or more message bus topics and obtain each consumption record from CHF 230 that is labeled with topic(s) to which an external system 240 subscribes. External system 240 may process the consumption record and store the record, for example, as part of a dynamic data set in a database.

Message bus 250 may include a message bus to provide data from CHF 230 to the various external systems 240. The data may include event messages generated by event generation function 234. Message bus 250 may support, for example, a publish-subscribe (pub-sub) model. According to an implementation, message bus 250 may include a distributed streaming platform that publishes streams of records from producers/contributors (e.g., CHF 230) to consumers (e.g., external systems 240), stores the streams of records in a fault-tolerant durable manner, and processes the streams of records. For example, CHF 230 may publish messages to message bus 250 for distribution to multiple different external systems 240. Message bus 250 may be implemented using a Pulsar bus or Kafka bus, for example, and CHF 230 may contribute a stream of records to one or more topics. According to an implementation, message bus 250 may be configured with a partitioned topic specific to CHF consumption records. In one aspect, the CHF consumption records topic may be configured to have maximum data retention policy associated with the message bus settings (e.g., to avoid data loss). External systems 240 may subscribe to the one or more topics and selectively retrieve records of subscribed topics for consumption.

Figure 4:
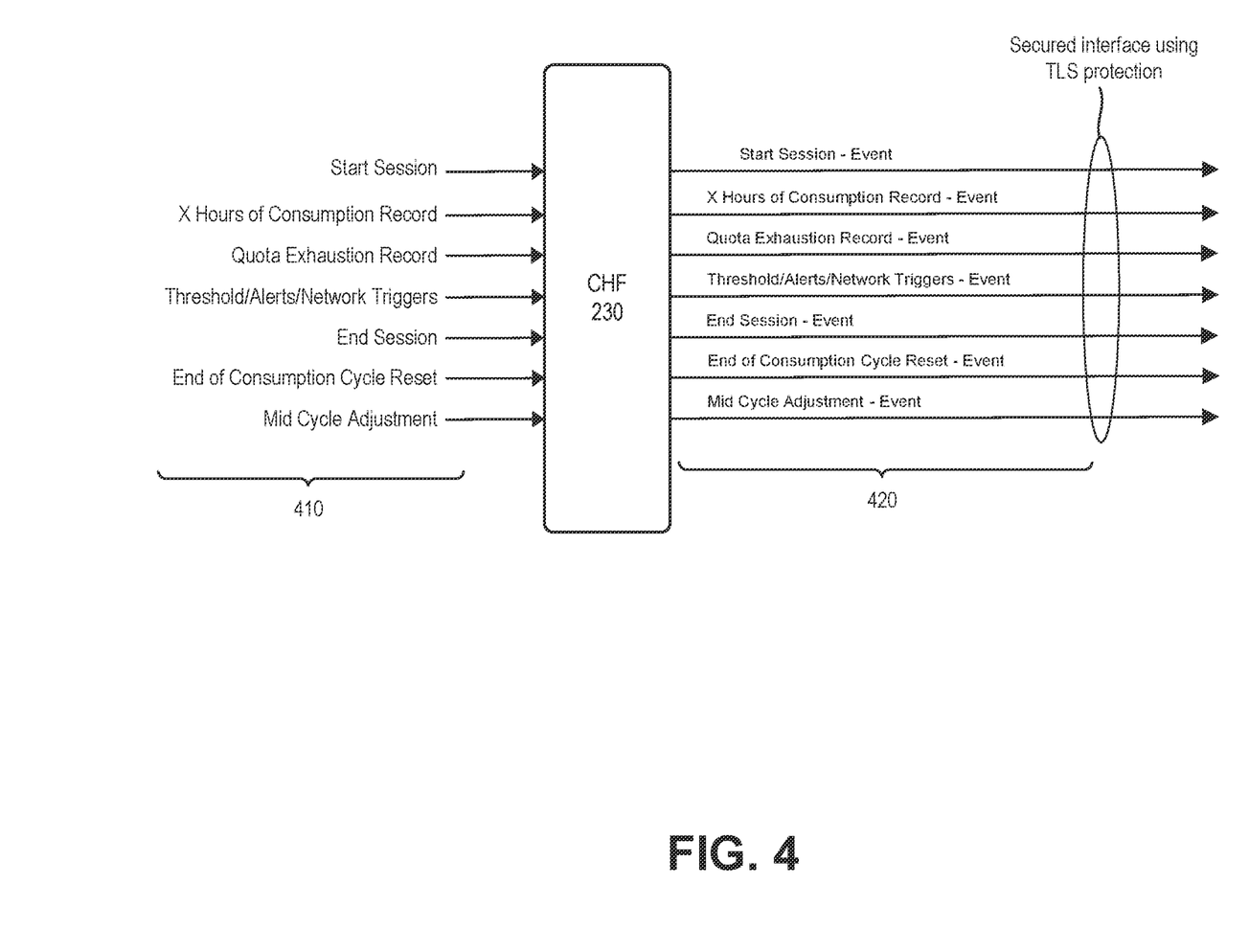
FIG. 4 is a diagram illustrating examples of events that may be associated with a data session.

FIG. 4 is an illustration of data that may be provided by CHF 230 as consumption event messages. Assume, for example, one of 4G wireless network components 210 or 5G wireless network components 220 (e.g., SMF 222) provides to CHF 230 session-related data 410 for different network activity during an individual session. The session-related data 410 may include a start session data, a number of hours of consumption record, a network quota exhaustion record, a trigger indication, end session data, a consumption cycle reset, and/or a mid-cycle adjustment. Each instance (or record) of session-related data 410 may be separately provided to CHF 230. CHF 230 may process each instance of session-related data 410 online (e.g., without collecting multiple records into a file) to provide a separate consumption event 420 corresponding to each instance of session-related data 410. Thus, in the example of FIG. 4, events 420 may include a start session event, a number of hours of consumption record event, a quota exhaustion record event, a trigger indication event, an end session event, a consumption cycle reset event, and/or a mid-cycle adjustment event.

Events 420 may be processed in real time or near-real time and provided to message bus 250, where up-to-date network consumption data is then available to external systems 240. Real-time events 420 may include critical session-related data, such as duration of the session in terms of a timestamp (e.g., recorded opening time or closing time), type of the data session (e.g., media, social, web browsing, etc.), currency consumption counter details, location information, and others. This type of information had been part of heavyweight records in previous systems that used offline file transfer protocol (FTP) and could not be delivered in real-time.

Figure 5:
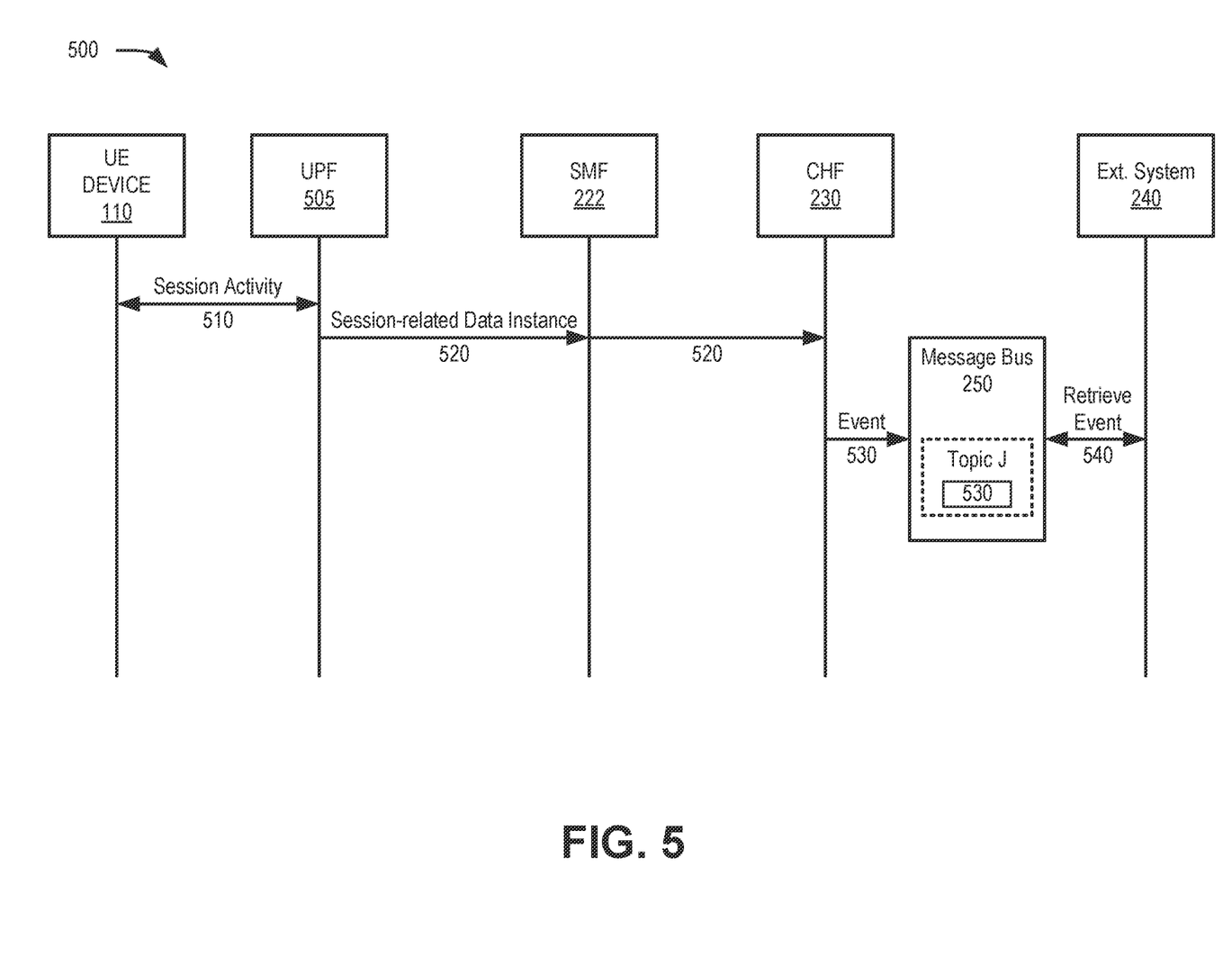
FIG. 5 is a diagram illustrating example communications to implement real-time network consumption tracking for an event.

FIG. 5 illustrates communications in a portion 500 of network environment 100 to implement real-time network consumption tracking for an event. FIG. 5 provides simplified illustrations of communications in network portion 500 and is not intended to reflect every signal or communication exchanged between devices/functions. As shown in FIG. 5, network portion 500 may include UE device 110, SMF 222, CHF 230, external system 240, and a UPF 505.

Assume UE device 110 is connected to a provider network and establishes a data session via UPF 505. UPF 505 may monitor session activity 510. For example, UPF 505 may be configured to report parameters of session activity 510 that are used for determining charges for the data flow such as, for example, the network slice, QoS class, and/or application identifier associated with the data flow. Furthermore, UPF 505 may be configured to measure and report performance parameters for services to UE device 110 such as, for example, data throughput, data rate, latency, jitter, etc. For each separate action (e.g., start, stop, quota, etc.), UPF 505 may provide a session-related data instance 520 to SMF 222. For example, UPF 505 may send session-related data (such as online/offline charging) to SMF 222 to be processed and sent to CHF 230. SMF 222 may forward session-related data instance 520 to CHF 230.

CHF 230 may collect session-related data instance 520 and publish a record to message bus 250 as event 530. As described above, CHF 230 implements a transaction-based process where each record is published without delay, instead of collecting multiple records for a file. According to an implementation, CHF 230 may publish event 530 to message bus 250 under a designated topic (e.g., "Topic J") using a secure interface with TLS protection.

As indicated by reference 540, external system 240 may obtain event 530 from message bus 250, process event 530, and store event 530. For example, external system 240, having previously subscribed to "Topic J" on message bus 250 may receive event 530. According to an implementation, event 530 may be accessible to external system 240 in near real time (e.g., with no delay for collecting/combining multiple transaction records). Each external system 240 may store event 530 with other events (e.g., other "Topic J" events obtained through message bus 250) and use information from event 530 to assemble dynamic network consumption data sets that may be continuously updated. According to an implementation, the process to read, translate, and store event 530 by external system 240 may take a few seconds. Thus, updated data sets of network consumption may be available to users/devices accessing external system 240 within several seconds of each activity transaction (e.g., less than 60 seconds).

Figure 6:
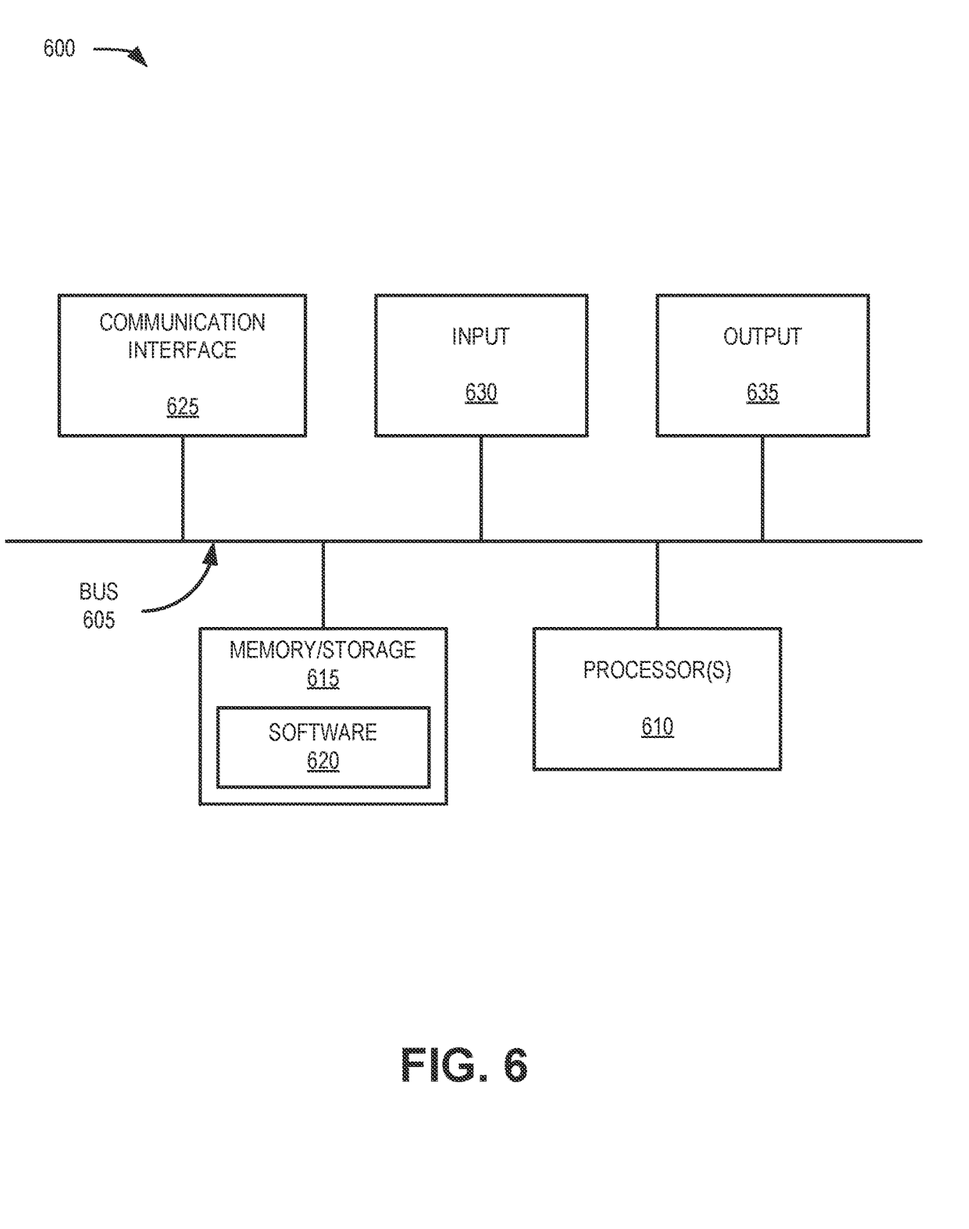
FIG. 6 is a diagram illustrating example components of a device that may correspond to one or more of the devices described herein.

FIG. 6 is a diagram illustrating example components of a device 600 that may be included in one or more of the devices described herein. For example, device 600 may correspond to UE device 110, access device 125, MEC device 145, network device 155, 4G wireless network components 210, 5G wireless network components 220, CHF 230, external device 240, UPF 505, and/or other types of devices, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation, or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, learning, model-based, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to CHF 230, software 620 may include an application that, when executed by processor 610, provides a function and/or a process of the real-time network consumption tracking service, as described herein. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service-based interface, or a reference interface, for example.

Input 630 permits an input into device 600. For example, input 630 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 600 may be implemented in the same manner. For example, device 600 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., external network 120) and/or another type of network (e.g., access network 110, core network 130, etc.). Thus, network devices described herein may be implemented as device 600.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 may cause processor 610 to perform a function or a process described herein. Alternatively, for example, according to other implementations, device 600 performs a function or a process described herein based on the execution of hardware (processor 610, etc.).

Figure 7:
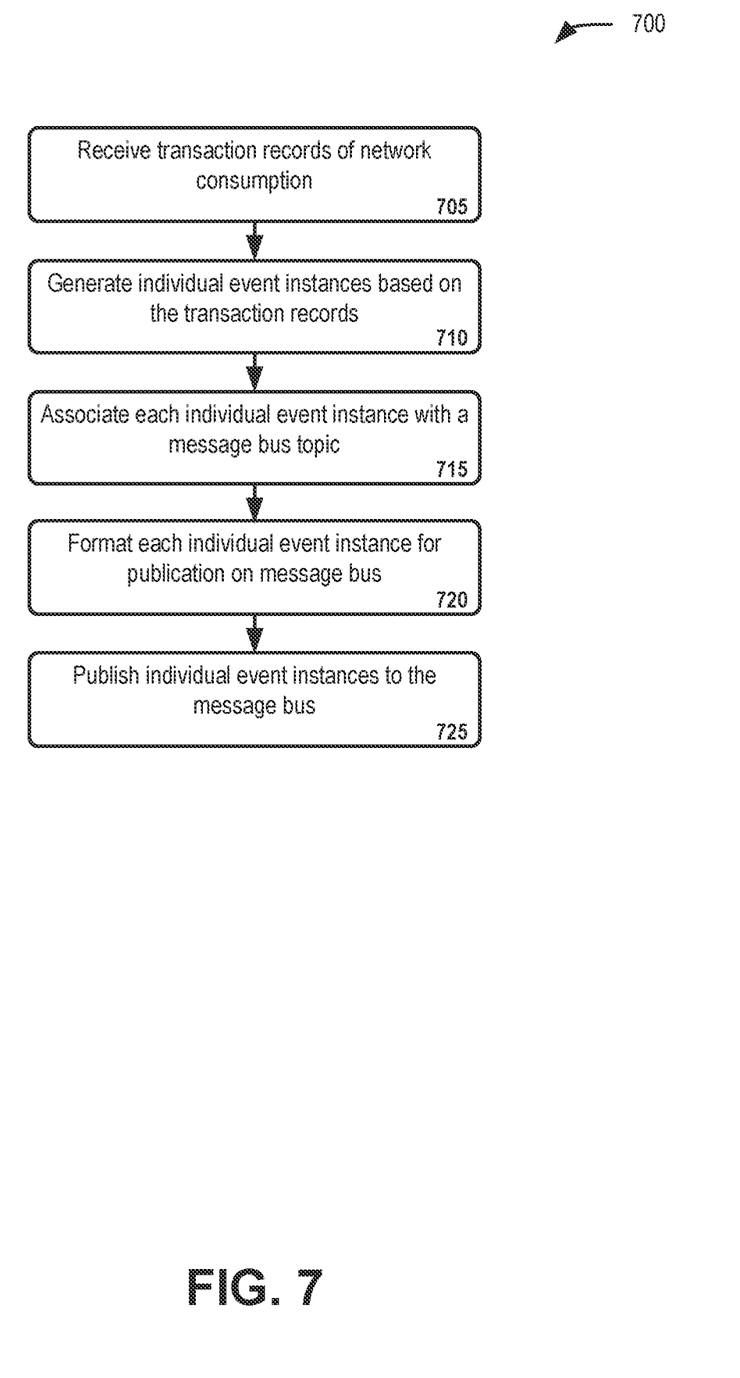
FIG. 7 is a flow diagram illustrating an example process for performing real-time network consumption tracking, according to an implementation described herein.

FIG. 7 is a flow diagram illustrating an example process 700 for performing real-time network consumption tracking, according to an implementation described herein. In one implementation, process 700 may be implemented by CHF 230. In another implementation, process 700 may be implemented by CHF 230 in conjunction with one or more other devices in network environment 100.

Process 700 may include receiving a transaction record of network consumption (block 705) and generating an individual event record based on the transaction record (block 710). For example, CHF 230 may receive transaction records (e.g., session-related data 410) of network consumption by devices in a wireless network. CHF 230 may generate individual event instances based on each of the transaction records. Each of the individual event instances may include a notification and a detailed record based on one of the transaction records.

Process 700 may also include associating the individual event record with a message bus topic (block 715). For example, CHF 230 may associate an individual event instance with a message bus topic for message bus 250. In one implementation, the message bus topic may include a dedicated topic for network consumption events. In other implementations, the message bus topic may be selected from a group of topics associated with network consumption events.

Process 700 may further include formatting the individual event instance for publication on a message bus (block 720), and publishing the individual event record to the message bus (block 725). For example, CHF 230 may format the individual event instance for publication on message bus 250 and publish the individual event records to message bus 250 using the assigned topic. According to an implementation, CHF 230 may publish the individual event records without compiling a file of multiple records.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 7, and message/operation/deployment flows with respect to FIGS. 2 and 5, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a charging function (CHF) device for a core network, transaction records of network consumption by user equipment (UE) devices in a wireless network;
   generating, by the CHF device, individual event messages based on each of the transaction records, wherein each of the individual event messages includes a detailed record based on one of the transaction records;
   associating, by the CHF device, each of the individual event messages with a message bus topic;
   formatting, by the CHF device, each of the individual event messages for publication on a message bus; and
   publishing, by the CHF device, each of the formatted individual event messages to the message bus, wherein the message bus stores the formatted individual event messages for retrieval by external systems that generate dynamic network consumption data sets based on the formatted individual event messages.

2. The method of claim 1, further comprising:
   parsing, after the receiving, each of the transaction records for conformance with a standard data model.

3. The method of claim 2, further comprising:
   formatting, after the parsing, each of the transaction records into a uniform format.

4. The method of claim 1, further comprising:
   obtaining, by an external system, from the message bus the formatted individual event messages, and
   adding, by the external system, information from the formatted individual event messages to one of the dynamic network consumption data sets.

5. The method of claim 1, wherein receiving the transaction records includes:
   receiving some of the transaction records from 4G network components over a Gy interface, and
   receiving other of the transaction records from 5G network components over an Nchf interface.

6. The method of claim 1, wherein each of the individual event messages further includes a lightweight notification component.

7. The method of claim 1, wherein the message bus topic includes a dedicated topic for network consumption events.

8. The method of claim 1, wherein publishing each of the individual event messages includes providing each of the individual event messages to the message bus using Hypertext Transfer Protocol Secure (HTTPS) signaling.

9. A system comprising:
   a message bus; and
   a charging function (CHF) device including a processor configured to:
      receive transaction records of network consumption by user equipment (UE) devices in a wireless network,
      generate individual event messages based on each of the transaction records, wherein each of the individual event messages includes a detailed record based on one of the transaction records,
      associate each of the individual event messages with a message bus topic,
      format each of the individual event messages for publication on the message bus, and
      publish each of the formatted individual event messages to the message bus,
   wherein the message bus stores the formatted individual event messages for retrieval by external systems that generate dynamic network consumption data sets based on the formatted individual event messages.

10. The system of claim 9, wherein the processor is further configured to:
    parse, after the receiving, each of the transaction records for conformance with a standard data model.

11. The system of claim 10, wherein the processor is further configured to:
    format, after the parsing, each of the transaction records into a uniform format.

12. The system of claim 9, further comprising:
    an external system configured to:
       obtain from the message bus the formatted individual event messages, and
       add information from the formatted individual event messages to one of the dynamic network consumption data sets.

13. The system of claim 9, wherein, when receiving the transaction records, the processor is further configured to:
    receive some of the transaction records from 4G network components over a Gy interface, and
    receive other of the transaction records from 5G network components over an Nchf interface.

14. The system of claim 9, wherein each of the individual event messages further includes a lightweight notification component.

15. The system of claim 9, wherein the message bus topic includes a dedicated topic for network consumption events, and wherein the message bus supports a publish-subscribe model.

16. The system of claim 10, wherein, when publishing each of the individual event messages, the processor is further configured to:
    provide each of the individual event messages to the message bus using Hypertext Transfer Protocol Secure (HTTPS).

17. A non-transitory computer-readable medium containing instructions executable by at least one processor of a charging function (CHF) device, the computer-readable medium comprising one or more instructions for:
    receiving transaction records of network consumption by user equipment (UE) devices in a wireless network;
    generating individual event messages based on each of the transaction records, wherein each of the individual event messages includes a detailed record based on one of the transaction records;
    associating each of the individual event messages with a message bus topic;
    formatting each of the individual event messages for publication on a message bus; and
    publishing each of the formatted individual event messages to the message bus, wherein the message bus stores the formatted individual event messages for retrieval by external systems that generate dynamic network consumption data sets based on the formatted individual event messages.

18. The non-transitory computer-readable medium of claim 17, further comprising one or more instructions for:
   parsing, after the receiving, each of the transaction records for conformance with a standard data model; and
   formatting, after the parsing, each of the transaction records into a uniform format.

19. The non-transitory computer-readable medium of claim 17, wherein the message bus topic includes a dedicated topic for network consumption events.

20. The non-transitory computer-readable medium of claim 17, wherein the instructions for receiving the transaction records further comprise one or more instructions for:
   receiving some of the transaction records from 4G network components over a Gy interface, and
   receiving other of the transaction records from 5G network components over an Nchf interface.

* * * * *